United States Patent [19]
Haggerson et al.

[11] Patent Number: 5,956,690
[45] Date of Patent: Sep. 21, 1999

[54] BUNDLED BILLING ACCOUNTING COMPUTER SYSTEMS

[75] Inventors: Michelle Marie Haggerson, Birmingham; Glenn Joseph Engman, Warren; James Vincent Estes, Clawson, all of Mich.

[73] Assignee: The Detroit Medical Center, Detroit, Mich.

[21] Appl. No.: 08/922,962

[22] Filed: Sep. 3, 1997

[51] Int. Cl.[6] .................................................. G06F 15/02
[52] U.S. Cl. .............................. 705/3; 235/375; 364/200
[58] Field of Search ........................... 235/375; 364/200, 364/406; 395/232; 705/29, 30, 2, 3, 4; 128/630

[56] References Cited

U.S. PATENT DOCUMENTS

| | | | |
|---|---|---|---|
| 4,135,241 | 1/1979 | Stanis et al. | 364/200 |
| 4,667,292 | 5/1987 | Mohlenbrock et al. | 364/406 |
| 4,858,121 | 8/1989 | Barber et al. | 364/406 |
| 5,229,584 | 7/1993 | Erickson | 235/375 |
| 5,606,497 | 2/1997 | Cramer et al. | 395/232 |
| 5,713,350 | 2/1998 | Yokota et al. | 128/630 |
| 5,732,401 | 3/1998 | Conway | 705/29 |
| 5,799,286 | 8/1998 | Morgan et al. | 705/30 |

OTHER PUBLICATIONS

American Health Consultants' Physician's Managed Care Report; Nov. 1995, vol. 3, No. 11, pp. 121–126.
American Health Consultants' Physician's Managed Care Report; Jul. 1996, vol. 4, No. 7, pp. 73–76.
Physician's Capitation Survival, *Shared–cost pilot program aligns provider incentives*; Apr. 1996, pp. 44–45.
St. Anthony's A Health Care Capitation Report; Apr. 1996, vol. 2, No. 12, pp. 1–8.

*Primary Examiner*—Kevin J. Teska
*Assistant Examiner*—Mark J. Fink
*Attorney, Agent, or Firm*—Harness, Dickey & Pierce, P.L.C.

[57] ABSTRACT

An apparatus and method for altering billing and accounts payable invoice deliveries. A bundled billing computer application sends messages indicating when billing and invoicing is to occur based upon a predetermined bill drop criteria. The computer application clusters billing information resulting from multiple patients activities that occur over a predetermined period of time. The bills and invoices related to the multiple patient events are generated once over that period of time according to the bill drop criteria.

18 Claims, 17 Drawing Sheets

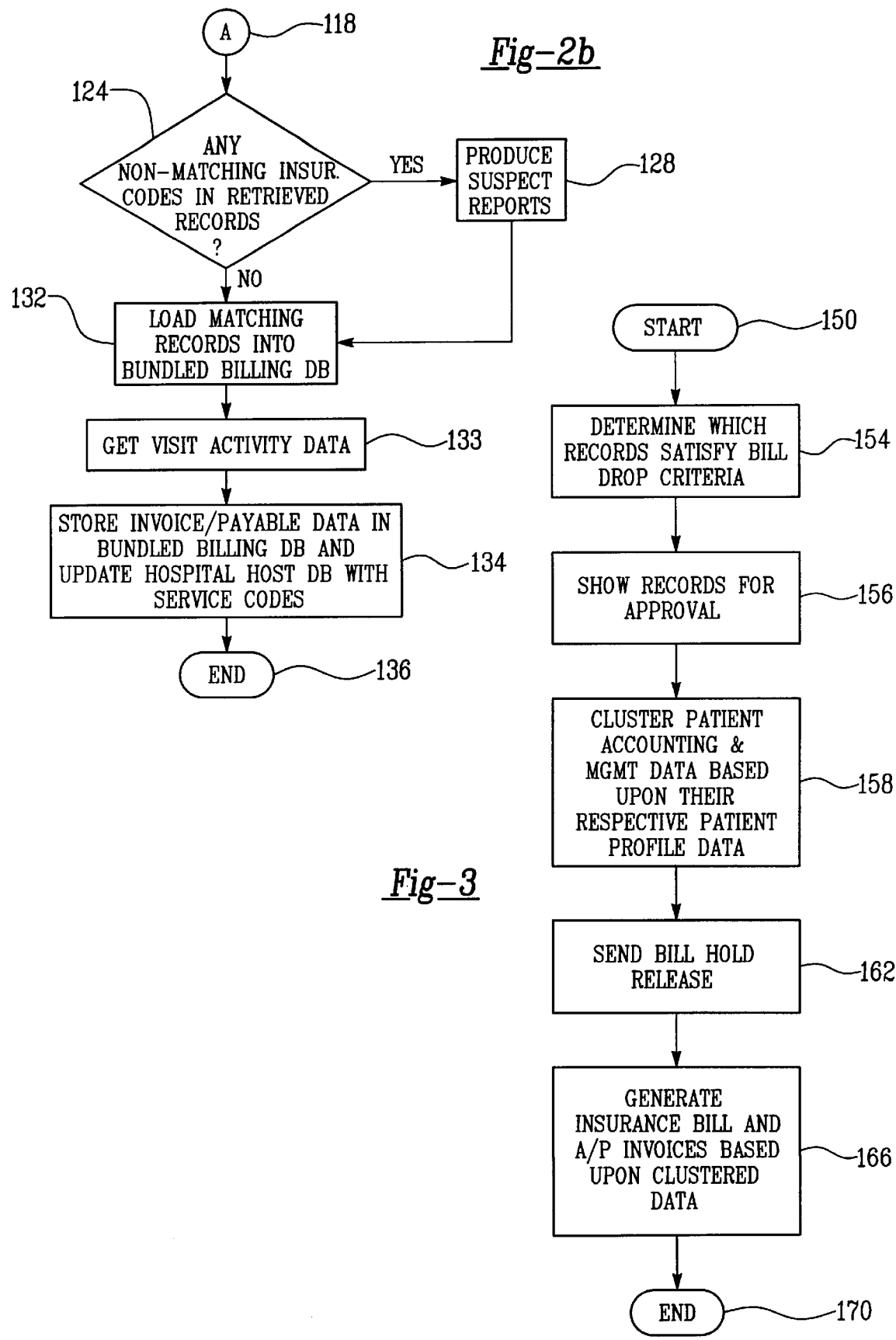

Fig-6a

PGM: SMCBBN06      BUNDLE SUSPECT REPORT      REPORT DATE: 08/24/97
BONE MARROW      PAGE: 1

| SUSPECT INS PLAN | MED REC NBR | PATIENT NO | NAME | ADMIT DATE | SUSPECT REASON |
|---|---|---|---|---|---|
| F09 | 485609236 | 10341683-0 | BETCHER, ALAN | 08/22/97 | ZERO INS SEGMENTS ON SMS |
| K51 | 462464652 | 19000882-1 | McINTOSH, CARL | 08/23/97 | INVALID BUNDLE CODE ON SMS |
| F51 | 481548117 | 10341928-9 | TAYLOR, SCOTT | 08/22/97 | INVALID BUNDLE CODE ON SMS |
| F51 | 481548117 | 10339005-0 | TAYLOR, SCOTT | 08/19/97 | INVALID BUNDLE CODE ON SMS |
| L01 | 484744644 | 10339538-0 | O'NEILL, CLARE | 08/20/97 | INVALID BUNDLE CODE ON SMS |
| R02 | 482788725 | 10340955-3 | SMITH, JACK | 08/22/97 | INVALID BUNDLE CODE ON SMS |
| K51 | 476409881 | 10337866-7 | JONES, KEVIN | 08/17/97 | INVALID BUNDLE CODE ON SMS |
| K01 | 476409881 | 10341257-3 | JONES, KEVIN | 08/22/97 | INVALID BUNDLE CODE ON SMS |
| K51 | 476409881 | 10338092-9 | JONES, KEVIN | 08/17/97 | INVALID BUNDLE CODE ON SMS |
| F51 | 475528307 | 10338307-2 | WILLIAMS, SUSAN | 08/20/97 | INVALID BUNDLE CODE ON SMS |
| L01 | 469965077 | 10340548-6 | McCARTY, SCOTT | 08/21/97 | INVALID BUNDLE CODE ON SMS |
| F19 | 468545547 | 10337990-5 | SMITH, WILLIAM | 08/17/97 | ZERO INS SEGMENTS ON SMS |
| S01 | 474448102 | 10338497-0 | DOE, JAMES | 08/19/97 | INVALID BUNDLE CODE ON SMS |
| L01 | 491561788 | 10340595-7 | RHEUMUE, IRENE | 08/22/97 | INVALID BUNDLE CODE ON SMS |
| L01 | 491561788 | 10338939-1 | RHEUMUE, IRENE | 08/19/97 | INVALID BUNDLE CODE ON SMS |
| L01 | 491561788 | 10337300-7 | RHEUMUE, IRENE | 08/18/97 | INVALID BUNDLE CODE ON SMS |
| K51 | 466602130 | 10338351-9 | YOUNG, MAX | 08/19/97 | INVALID BUNDLE CODE ON SMS |
| F01 | 476348387 | 10339685-9 | THOMPSON, LARRY | 08/22/97 | INVALID BUNDLE CODE ON SMS |
| S01 | 466420341 | 10329001-1 | McCARTHY, JOSEPH | 08/18/97 | INVALID BUNDLE CODE ON SMS |
| F51 | 485564318 | 10341155-9 | WOODWARD, MARY | 08/22/97 | INVALID BUNDLE CODE ON SMS |
| A89 | 479304120 | 10338359-2 | WILSON, SAM | 08/19/97 | INVALID BUNDLE CODE ON SMS |
| L05 | 477602992 | 10338923-5 | DOMINO, KAHTY | 08/19/97 | INVALID BUNDLE CODE ON SMS |
| L05 | 477602992 | 10339586-9 | DOMINO, KAHTY | 08/22/97 | INVALID BUNDLE CODE ON SMS |
| 111 | 401146499 | 0-0 | MORRIS, CHRIS | 08/26/97 | NO SMS RECORD EXIST |
| L01 | 463461682 | 10337948-3 | NELSON, BRANDY | 08/19/97 | INVALID BUNDLE CODE ON SMS |
| A89 | 416284040 | 10341441-3 | CARNES, SHANNON | 08/22/97 | INVALID BUNDLE CODE ON SMS |
| A89 | 416284040 | 10340602-1 | CARNES, SHANNON | 08/21/97 | INVALID BUNDLE CODE ON SMS |
| A89 | 416284040 | 10340274-9 | CARNES, SHANNON | 08/20/97 | INVALID BUNDLE CODE ON SMS |
| F64 | 478447657 | 10339645-3 | STOTTS, CHRIS | 08/22/97 | INVALID BUNDLE CODE ON SMS |
| F64 | 478447657 | 10341368-8 | STOTTS, CHRIS | 08/22/97 | INVALID BUNDLE CODE ON SMS |
| F64 | 478447657 | 10337993-9 | STOTTS, CHRIS | 08/17/97 | INVALID BUNDLE CODE ON SMS |

PGM NAME: SMCBBN80  BUNDLE SUNQUEST PROFEE CHARGE EXTRACT ERROR LISTING  BUNDLE TYPE:01  PAGE:1  RUN DATE: 08/23/97

| PATIENT NO | TDATE | PATIENT NAME | ERROR MESSAGE |
|---|---|---|---|
| 0102685542 | 062397 | THOMPSON, VICTOR | NO COMFILE REC - CHGCODE : 1240125 CPT4: 85007 |
| 0102685542 | 062297 | THOMPSON, VICTOR | NO COMFILE REC - CHGCODE : 1255527 CPT4: 16900 |
| 0102685542 | 061897 | THOMPSON, VICTOR | NO COMFILE REC - CHGCODE : 1205385 CPT4: 80002 |
| 0102685542 | 061697 | THOMPSON, VICTOR | NO COMFILE REC - CHGCODE : 1215173 CPT4: 80158 |
| 0102685542 | 062197 | THOMPSON, VICTOR | NO COMFILE REC - CHGCODE : 1255340 CPT4: 86922 |
| 0102685542 | 061897 | THOMPSON, VICTOR | NO COMFILE REC - CHGCODE : 1205500 CPT4: 80002 |
| 0102685542 | 062497 | THOMPSON, VICTOR | NO COMFILE REC - CHGCODE : 1205235 CPT4: 80007 |
| 0102685542 | 061997 | THOMPSON, VICTOR | NO COMFILE REC - CHGCODE : 1240125 CPT4: 85007 |
| 0102685542 | 062397 | THOMPSON, VICTOR | NO COMFILE REC - CHGCODE : 1205390 CPT4: 80016 |
| 0102685542 | 061797 | THOMPSON, VICTOR | NO COMFILE REC - CHGCODE : 1205235 CPT4: 80007 |
| 0102685542 | 061797 | THOMPSON, VICTOR | NO COMFILE REC - CHGCODE : 1205385 CPT4: 80002 |
| 0102685542 | 061897 | THOMPSON, VICTOR | NO COMFILE REC - CHGCODE : 1205235 CPT4: 85025 |
| 0102685542 | 061897 | THOMPSON, VICTOR | NO COMFILE REC - CHGCODE : 1240132 CPT4: 85029 |
| 0102685542 | 061897 | THOMPSON, VICTOR | NO COMFILE REC - CHGCODE : 1240102 CPT4: 85025 |
| 0102685542 | 061797 | THOMPSON, VICTOR | NO COMFILE REC - CHGCODE : 1215173 CPT4: 80158 |
| 0102685542 | 061997 | THOMPSON, VICTOR | NO COMFILE REC - CHGCODE : 1240132 CPT4: 85025 |
| 0102685542 | 061997 | THOMPSON, VICTOR | NO COMFILE REC - CHGCODE : 1205150 CPT4: 80002 |
| 0102685542 | 061897 | THOMPSON, VICTOR | NO COMFILE REC - CHGCODE : 1205235 CPT4: 80007 |
| 0102685542 | 062397 | THOMPSON, VICTOR | NO COMFILE REC - CHGCODE : 1235345 CPT4: 86329 |
| 0102685542 | 062697 | THOMPSON, VICTOR | NO COMFILE REC - CHGCODE : 1240125 CPT4: 85007 |
| 0102685542 | 062697 | THOMPSON, VICTOR | NO COMFILE REC - CHGCODE : 1240102 CPT4: 85029 |
| 0102685542 | 061897 | THOMPSON, VICTOR | NO COMFILE REC - CHGCODE : 1205390 CPT4: 80016 |
| 0102685542 | 062197 | THOMPSON, VICTOR | NO COMFILE REC - CHGCODE : 1240102 CPT4: 85029 |
| 0102685542 | 062697 | THOMPSON, VICTOR | NO COMFILE REC - CHGCODE : 1240132 CPT4: 85025 |
| 0102685542 | 062597 | THOMPSON, VICTOR | NO COMFILE REC - CHGCODE : 1205135 CPT4: 80002 |
| 0102685542 | 062497 | THOMPSON, VICTOR | NO COMFILE REC - CHGCODE : 1240102 CPT4: 85029 |
| 0102685542 | 062597 | THOMPSON, VICTOR | NO COMFILE REC - CHGCODE : 1240132 CPT4: 85025 |

Fig-6b

PGM NAME: SMCBBN85    BUNDLE MRM PROFEE CHARGE EXTRACT ERROR LISTING    BUNDLE TYPE: 01  PAGE:1  RUN DATE: 08/22/97

| PATIENT NO | TDATE | PATIENT NAME | ERROR MEESAGE |
|---|---|---|---|
| 102598034 | 042297 | JACKSON, PEARSON | NO COMFILE REC — CPT4 CODE: 7932 |
| 103087714 | 072497 | JACOBS, WILLIAM | NO COMFILE REC — CPT4 CODE: 94760 |
| 103087714 | 072497 | JACOBS, WILLIAM | NO COMFILE REC — CPT4 CODE: 99999 |

*Fig-6c*

```
-----------------------------------------------------------------
                          I N V O I C E                   PAGE  1
DATE: 08/16/97                             INVOICE NBR 19970816001
  VENDOR: AFFILIATED INTERNIST             INVOICE DATE 08/16/97
  P.O. NUMBER    2179559      BILL TO:
-----------------------------------------------------------------
LINE  QUANTITY   UM      DESCRIPTION              AMOUNT
-----------------------------------------------------------------
  1     1        EA      PROFESSIONAL FEE        $532.00

INVOICE APPROVED THROUGH THE BUNDLED BILLING
            APPLICATION BY:  BMT COORDINATOR:
```

```
------------------------------------------------------------
DATE: 08/16/97                I N V O I C E
------------------------------------------------------------
  AP INVOICE NUMBER 19970816001         AP INVOICE DATE 08/16/97
  PATIENT NAME: CORY, TIM       NBR: 000102272085  PLACE:  0
         SSN: 275900657 INVOICE #: 1860373    DATE: 00/00/00
    PRO STAFF: 052530  DR. BILL KAPTON     AFFILIATED INTERNIST
  SVC DATE TYP PRO CDE DESCRIPTION_____QTY  AMT BILLED  AMT APPROVED
  03/02/97      38231  PERIPH STEM CELL HARVE  1    $170.00      $136.00
                                               $170.00      $136.00

------------------------------------------------------------
DATE: 08/16/97                I N V O I C E
------------------------------------------------------------
  AP INVOICE NUMBER 19970816001         AP INVOICE DATE 08/16/97
  PATIENT NAME: CORY, TIM       NBR: 000102274057  PLACE:  0
         SSN: 275900657 INVOICE #: 1860373    DATE: 00/00/00
    PRO STAFF: 011924  DR. FELLY JONES      AFFILIATED INTERNIST
  SVC DATE TYP PRO CDE DESCRIPTION_____QTY  AMT BILLED  AMT APPROVED
  03/02/97      38231  PERIPH STEM CELL HARVE  1    $170.00      $136.00
                                               $170.00      $136.00

------------------------------------------------------------
DATE: 08/16/97                I N V O I C E
------------------------------------------------------------
  AP INVOICE NUMBER 19970816001         AP INVOICE DATE 08/16/97
  PATIENT NAME: CORY, TIM       NBR: 000102440815  PLACE:  1
         SSN: 275900657 INVOICE #: 1880568    DATE: 00/00/00
    PRO STAFF: 052530  DR. SAM THOMAS       AFFILIATED INTERNIST
  SVC DATE TYP PRO CDE DESCRIPTION_____QTY  AMT BILLED  AMT APPROVED
  04/19/97      99233  SUB. HOSPITAL CARE - L  1    $115.00       $92.00
  04/20/97      99233  SUB. HOSPITAL CARE - L  1    $115.00       $92.00
                                               $230.00      $184.00

------------------------------------------------------------
DATE: 08/16/97                I N V O I C E
------------------------------------------------------------
  AP INVOICE NUMBER 19970816001         AP INVOICE DATE 08/16/97
  PATIENT NAME: CORY, TIM       NBR: 000102272085  PLACE:  1
         SSN: 275900657 INVOICE #: 1880570    DATE: 00/00/00
    PRO STAFF: 050146  DR. BILL KAPTON      AFFILIATED INTERNIST
  SVC DATE TYP PRO CDE DESCRIPTION_____QTY  AMT BILLED  AMT APPROVED
  04/26/97      99238  DISCHARGE DAY MGT. <30  1     $95.00       $76.00
                                                $95.00       $76.00
```

*Fig-8*

|  |  |  |  |  |  | PATIENT CONTROL NO. |
|---|---|---|---|---|---|---|
|  | FED. TAX NO | STATEMENT COVERS |  | COV. | N-C D | 102095106 |
|  | 182391907 | 020597 | 030197 | 024 | 0000 |  |

JACK SMITH

| 14 BIRTHDATE | SEX | MS | ADMISSION |  | D HR | STAT | MEDICAL RECORD NO. | CONDITION CODES |
|---|---|---|---|---|---|---|---|---|
| 07191958 | M | S | 020597 | 06 | 3 | 1 | 14 | 01 | 84744644 |  |

| OCCURRENCE | OCCURRENCE | OCCURRENCE | OCCURRENCE | OCCURRENCE SPAN |
|---|---|---|---|---|
| A1 071958 |  |  |  |  |

JACK SMITH
<ADDRESS>

| VALUE CODES | VALUE CODES | VALUE CODES |
|---|---|---|
| A3  11885835 | 01  54500 | 30  1571589 |

| 42 REV. | 43 DESCRIPTION | HCPCS/RATES | SERV. DATE | SERV. UNITS | TOTAL CHARGES | NON COV. CHGS. |
|---|---|---|---|---|---|---|
| 120 | ROOM-BOARD/SEMI | 525 00 |  | 25 | 1362500 |  |
| 250 | PHARMACY |  |  |  | 2968833 |  |
| 258 | IV SOLUTIONS |  |  |  | 48676 |  |
| 260 | IV THERAPY |  |  |  | 2100 |  |
| 270 | MED-SUR SUPPLIES |  |  |  | 386400 |  |
| 300 | LABORATORY |  |  |  | 2167500 |  |
| 310 | PATHOLOGY LAB |  |  |  | 121000 |  |
| 320 | DX X-RAY |  |  |  | 48100 |  |
| 331 | CHEMOTHER/INJ |  |  |  | 119200 |  |
| 333 | RADIATION RX |  |  |  | 1269000 |  |
| 360 | OR SERVICES |  |  |  | 395600 |  |
| 361 | OR/MINOR |  |  |  | 13800 |  |
| 370 | ANESTHESIA |  |  |  | 121000 |  |
| 391 | BLOOD/ADMIN |  |  |  | 300700 |  |
| 410 | RESPIRATORY SVC |  |  |  | 41200 |  |
| 460 | PULMANARY FUNC |  |  |  | 83900 |  |
| 480 | CARDIOLOGY |  |  |  | 121500 |  |
| 510 | CLINIC |  |  |  | 102000 |  |
| 636 | DRUG/DETAIL CODE |  |  |  | 26343 |  |
| 710 | RECOVERY ROOM |  |  |  | 73000 |  |
| 730 | EKG/ECZ |  |  |  | 104000 |  |
| 960 | PRO FEE |  |  |  | 1577883 |  |
| 001 | TOTAL CHARGES |  |  |  | 11885835 |  |

| PAYER | PROVIDER | REL | ASG | PRIOR PAYMENTS | EST. AMOUNT DUE |
|---|---|---|---|---|---|
| <INSURANCE COMPANY> |  | Y | Y |  | 11885835 |

| INSURED'S NAME | REL | CERT. - SSN -HIC. - ID NO. | GROUP NAME | INSURANCE GROUP |
|---|---|---|---|---|
| JACK SMITH | 01 | 626078 |  | 00860 |

| TREATMENT AUTH. CODES | EMPLOYER NAME | EMPLOYER LOCATION |
|---|---|---|
| Y0005251352T | UNKNOWN |  |

| PRIN. DIAG | OTHER DIAG. CODES |
|---|---|
| 20410 | 2880  30924  5291  7011  5280  7847 |

| PRINCIPLE PROCEDURE | OTHER PROCEDURE | OTHER PROCEDURE |
|---|---|---|
| 9  4130  021397 | 9925  020697 | 9229  021097 |

| OTHER PROCEDURE | OTHER PROCEDURE | OTHER PROCEDURE |
|---|---|---|
| 0331  020597 | 5794  020597 | 9648  020597 |

<INSURANCE COMPANY>
<ADDRESS>

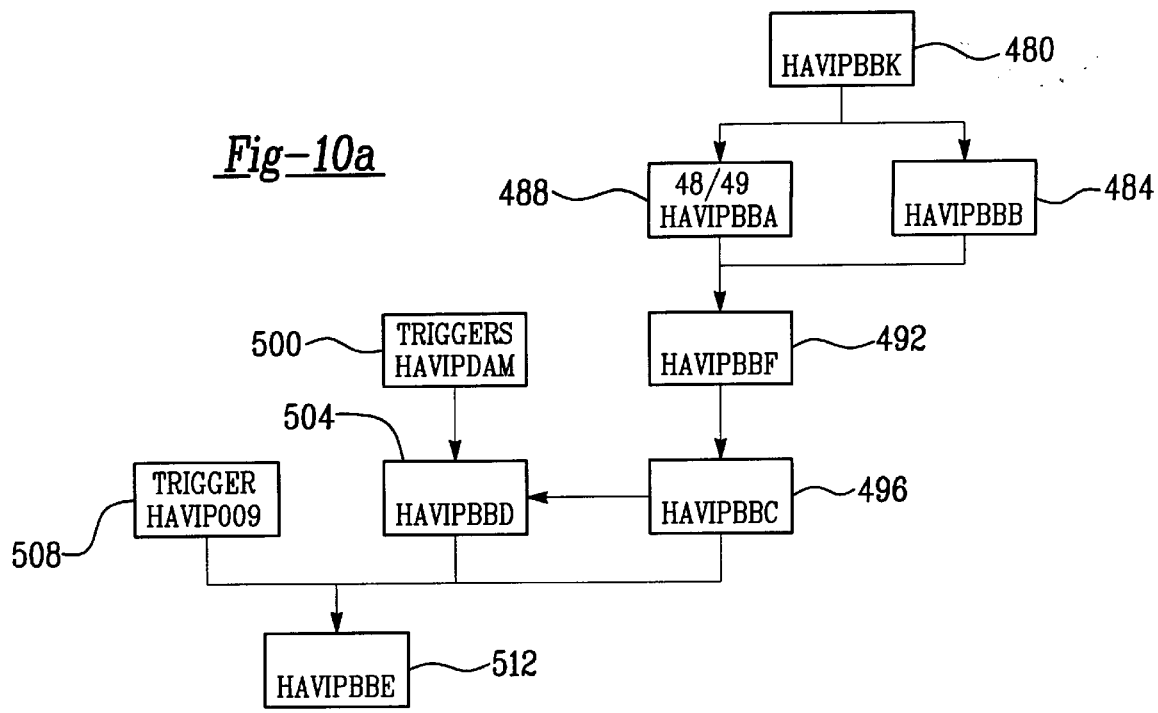
*Fig-10a*
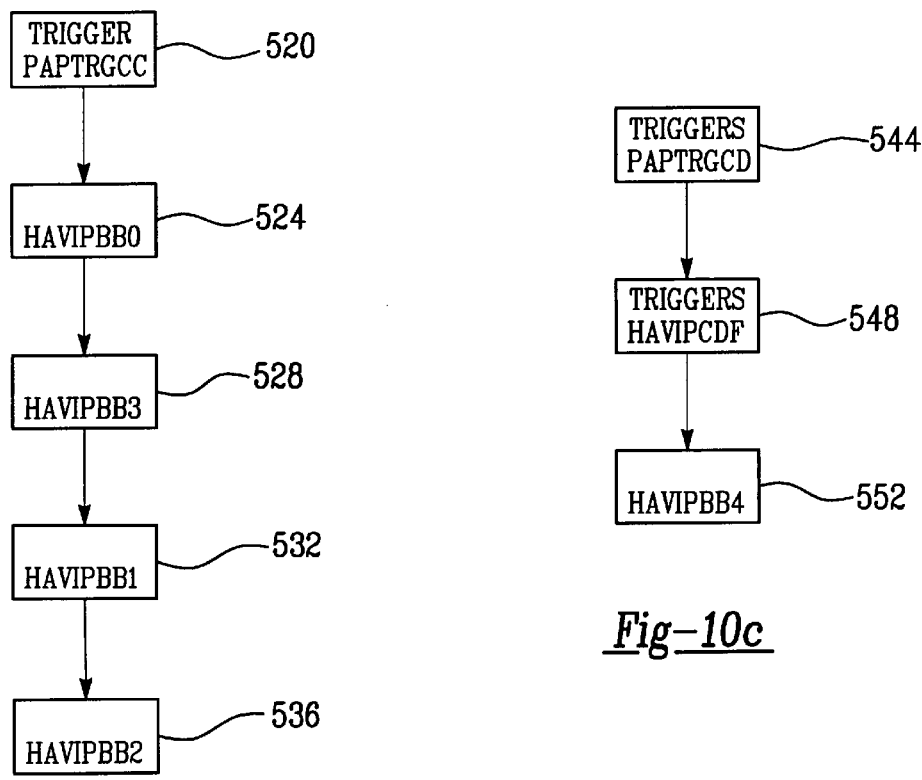
*Fig-10b*
*Fig-10c*

```
BN10 - SMCOBBN00            BUNDLE BILLING              08/28/97
SDHAGGE  -  J828            MESSAGE CENTER              17:01:02

MESSAGES FROM  08/18/97
    CAMPBELL ,MARCIE         SSN# 477-66-5707  INS PLAN : F09
    CHARGE ENTRY WILL BE CLOSED AT END OF BUSINESS  08/23/97

MORGAN ,CYNTHIA          SSN# 477-86-0081  INS PLAN : L07         ─800
    CHARGE ENTRY WILL BE CLOSED AT END OF BUSINESS  08/22/97

TAYLOR ,PERRY            SSN# 478-60-5741  INS PLAN : L07
    CHARGE ENTRY WILL BE CLOSED AT END OF BUSINESS  08/22/97

DONALDSON ,REBECA        SSN# 401-14-8205  INS PLAN : 111
    CHARGE ENTRY WILL BE CLOSED AT END OF BUSINESS  08/20/97

COPYRIGHT DETROIT MEDICAL CENTER 1996
    PF07-PREV    PF08-NEXT    PF10-PREDTE    PF11-NXTDTE    PF15-EXIT
                                                         ibm  17:04:05
```

```
BN00 - SMCOBBN10            BUNDLE BILLING              08/28/97
SDHAGGE  -  J828            MORNING REPORT              17:03:27

ENTER SS# FOR SEARCH         ENTER LAST NAME FOR SEARCH

ACT   PATIENT SS#    PATIENT NAME          BEGIN DATE   DEADLINE   STS
  -------------------------------------------------------------------
   -    432-78-1697    AMELL ,LAURANNE       07/10/97     10/29/97    I
   -    416-28-4040    MCNEIL ,NANCY L       07/03/97     10/08/97    I
   -    462-62-3881    MILLER ,VICTORIA ANN  07/03/97     08/29/97    I
   -    464-78-0871    TYLER ,JACQUELINE     04/29/97     10/11/97    I
   -    472-38-0335    THOMAS ,RUTH ANN      06/12/97     08/26/97    I
   -    472-50-4819    BACON ,MICHELLE       05/29/97     10/09/97    I
   -    475-52-8307    LOVE ,GWEN            08/08/97     09/28/97    I
   -    476-34-8387    STEWART ,EILEEN       06/13/97     09/05/97    I
   -    483-54-4782    ERFOURTH ,CAYLA       07/03/97     09/26/97    I
   -    484-30-4594    NELSON ,GERALDINE     07/17/97     09/12/97    I
   -    486-46-4495    BATES ,KAY            06/27/97     09/23/97    I
   -    462-84-7871    WHITE ,LIDIA          07/10/97     09/14/97    I

PF01-PAYMENT   PF02-ENTRY   PF04-STATUS   PF07-PREV   PF08-NEXT   PF15-EXIT
```

```
BN25 - SMCOBN25              BUNDLE BILLING                08/28/97
SDHAGGE - J828        PRO STAFF BILLING STATUS SUMMARY    17:03:27
```

PRO STAFF BILLING ID: 051607   SILVIA, JOSEPH M _____
SOCIAL SECURITY NBR:  ___-__-____  LAST NAME: _____

| ACT | SSN/STA DTE | PAT NAME/NBR | BILL DATE | CHK #/STATUS | INVOICE NBR |
|---|---|---|---|---|---|
| - | 495-66-2784 | WEISS ,MICHELE<br>000102831096 | 06/09/97 | N/A | MMH0609MRM001 |
| - | 467-11-8729 | TALOS ,BRENT MAX<br>000102956703 | 07/17/97 | N/A | MMH0719MRM01 |
| - | 467-50-1609 | PARRISH ,DIANE<br>000102224003 | 06/09/97 | N/A | MMH0609MRM009 |
| - | 468-54-5547 | TOMEY ,PATRICIA<br>000102441508 | 05/30/97 | N/A | MMH0530MRM004 |
| - | 472-38-0335 | THOMAS ,RUTH ANN<br>000103134847 | 07/18/97 | N/A | MMH0718MRM001 |
| - | 472-38-0335 | THOMAS ,RUTH ANN<br>000190008847 | 07/18/97 | N/A | MMH0718MRM011 |
| - | 477-86-0081 | MORGAN ,CYNTHIA<br>000103137659 | 07/18/97 | N/A | MMH0718MRM003 |

PF01-DETAIL    PF07-PREV    PF08-NEXT    PF15-EXIT ibm 17:12:04

```
BN25 - SMCOBN40              BUNDLE BILLING                08/28/97
SDHAGGE - J828          PRO FEE BILLING UPDATE             17:06:04
```

PRO STAFF BILLING ID: 2050146   JONES ,JARED L    INV # 1889502

| SVC DATE | TYP | PRO CD | MODIFIERS | DESCRIPTION/REJ CODES | QTY | CHARGE |
|---|---|---|---|---|---|---|
| 05/10/97 | - | 99232 | __ __ __ | SUB. HOSPITAL CARE - L | 1 | $90.00 |
| 05/11/97 | - | 99232 | __ __ __ | SUB. HOSPITAL CARE - L | 1 | $90.00 |
| 05/09/97 | - | 96410 | __ __ __ | IV INF UP TO 1*/HOUR__ | 1 | $90.00 |
| 05/09/97 | - | 96412 | __ __ __ | IV INF UP TO 8*/HOUR__ | 7 | $90.00 |
| 05/10/97 | - | 96410 | __ __ __ | IV INF UP TO 1*/HOUR__ | 1 | $85.00 |
| 05/10/97 | - | 96412 | __ __ __ | IV INF UP TO 8*/HOUR__ | 7 | $280.00 |

$910.00

PF15-EXIT ibm 17:08:59

```
BN30 - SMCOBN30                    BUNDLE BILLING                    09/01/97
SDHAGGE  - J421              PRO STAFF BILLING STATUS DETAIL         12:11:29
```

PATIENT NAME : SMITH, GALE        NBR: 000102221538    PLACE:  0
         SSN : 66602130     STATUS : APPROVED    REVIEW DATE : 06/26/97
   PRO STAFF : 2050146      JONES, JARED L       INVOICE # : KMM0609199701
INVOICE DATE :              CHECK # :            CHECK DATE :

| SVC DATE | TYPE | PRO CD | MODIFIERS/DESC | QTY | AMT BILLED | AMT APPROVED |
|----------|------|--------|----------------|-----|------------|--------------|
| 02/24/97 |      | 38231  |                | 1   | $170.00    | $136.00      |
|          |      |        | PERIPH STEM CELL HARVESTIN | | | |
| 02/25/97 |      | 38231  |                | 1   | $170.00    | $136.00      |
|          |      |        | PERIPH STEM CELL HARVESTIN | | | |
| 02/26/97 |      | 38231  |                | 1   | $170.00    | $136.00      |
|          |      |        | PERIPH STEM CELL HARVESTIN | | | |
| 02/27/97 |      | 38231  |                | 1   | $170.00    | $136.00      |
|          |      |        | PERIPH STEM CELL HARVESTIN | | | |
| 02/28/97 |      | 38231  |                | 1   | $170.00    | $136.00      |
|          |      |        | PERIPH STEM CELL HARVESTIN | | | |

PF15-EXIT           $850.00     $680.00

*Fig-13e*

```
BN0B - SMCOBN0B                    BUNDLE BILLING                    08/16
SDHABBE - E318               PATIANT PROFILE SCREEN                  14:02
```

ENTER REC TYPE _   P (PATIENT)
                      D (DONOR)

___-__-____
   ENTER SS# FOR SEARCH OR ADD        ENTER LAST NAME (ALSO FOR SEARCH)

__
   INS PLAN CODE                      CONTRACTUAL AMOUNT

ENTER COVERAGE DATES  IN MM/DD/YY
   __/__/__/     __/__/__/
   BEGIN DATE    END DATE             DONOR'S RECIPIENT SSN

PF01-ADD     PF07-PAGE BACKWARD    PF03-PATIENT TIMETABLE    PF04-REFER:
   PF12-DELETE  PF08-PAGE FORWARD     PF24-HELP                 PF15-EXIT

*Fig-14*

BUNDLED BILLING ACCOUNTING COMPUTER SYSTEMS

BACKGROUND AND SUMMARY OF THE INVENTION

The present invention relates generally to computerized accounting systems. More particularly, the present invention relates to a computerized hospital bundled billing accounting system.

When a hospital patient requires long-term care (e.g., cancer patients, bone marrow transplant patients) and months of inpatient and outpatient treatment, the number of claims sent to the insurance company dramatically escalates; the number of bills and other pieces of paper that each entity (e.g., an insurance company, physicians' offices, hospitals, etc.) have to process becomes time and cost consuming.

Moreover, due to the number of entities participating in the treatment and care of patients, an accurate assessment of the overall cost for the services provided by all these entities is traditionally difficult to ascertain. Consequently, quotes provided by the hospitals to insurance companies can be inaccurate thereby resulting in hospitals losing money due to an underbid service contract with the insurance company or leading to an insurance company paying too much money for a particular course of treatment.

To these and other ends, the present invention is a computer-implemented method for aperiodically processing patient accounting data in a periodic hospital accounting database. Patient profile data is received which establishes activity criteria for grouping activities by a patient. Patient profile data is associated with a predeteremined bill drop criteria. A plurality of accounting data is received that is indicative of activities by a patient. For the accounting data that satisfies the activity criteria of the patient profile data, the following steps are performed: associating the satisfied accounting data with the patient profile data; and generating bill stay flags associated with the satisfied accounting data on the periodic hospital accounting database. The following steps are performed when the bill drop criteria of the patient profile data is satisfied: retrieving the patient accounting data that is associated with the patient profile data; and generating financial data based upon the retrieved patient accounting data.

For a more complete understanding of the invention, its objects and advantages, reference may be had to the following specification and to the accompanying drawings.

BRIEF DESCRIPTION OF THE DRAWINGS

FIG. 1b is a functional allocation diagram depicting functionality of the computer architecture of FIG. 1a;

FIGS. 2a–2b are flowcharts depicting the computer processing steps related to the data processing of patient profile data;

FIG. 3 is a flowchart depicting the computer processing steps for generating an insurance bill or an accounts payable invoice based upon the present invention;

FIGS. 6a–6c are computer generated reports depicting suspect reports and error reports;

FIG. 7 is an exemplary computer generated data output depicting a bundled billing accounts payable invoice;

FIG. 8 is an exemplary computer generated data output showing individualized invoices that provide supporting detail for the bundled billing accounts payable invoice of FIG. 7;

FIG. 9 is an exemplary computer data output depicting a bundled insurance bill;

FIGS. 10a–10c are structure charts depicting the flow of the batch processes used in the preferred embodiment of the present invention;

FIGS. 13a–13e are exemplary computer screens for accessing the data of the present invention; and FIG. 14 is an exemplary computer screen depicting the bundle billing patient profile screen.

DESCRIPTION OF THE PREFERRED EMBODIMENTS

Figure 1A:
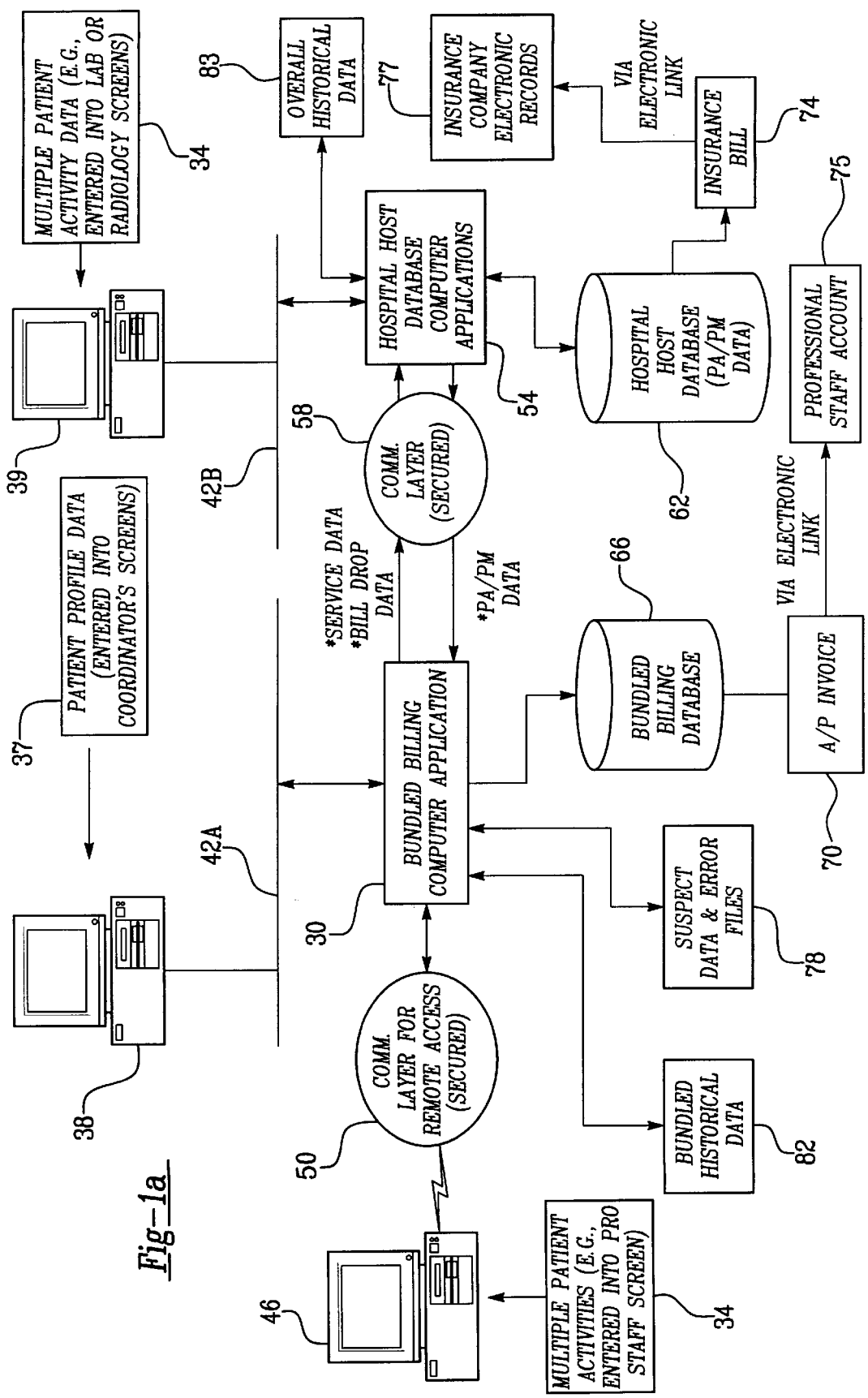
FIG. 1a is a schematic drawing depicting a computer architecture of the present invention.

With reference to FIG. 1a, there is shown the computer architecture scheme for an hospital accounting system which, among other things, generates bills and invoices. A novel bundled billing computer application 30 is provided to capture and bundle (i.e., cluster) billing information resulting from multiple patients activities 34 that occur over a predetermined period of time. A patient activity may include a patient having x-rays at a hospital or a doctor visit. Also, the computer system of FIG. 1a: captures Professional Fee Billing data (at computer 46) for creating accounts payable invoices 70; and updates the hospital's host database with professional services data received from computer 46.

Data about multiple patient activities is entered via computer-human interfaces. For example, professional fee billing information about the multiple patient activities 34 may be entered into computer 38 which is in data communication with bundled billing computer application 30 via network 42A. Also for example, multiple patient activity data 34 is entered from a lab or radiology computer 39 which is in data communication with the host computer 54 via network 42B. The bundled billing computer application 30 uses the patient profile data as the basis for retrieving this data from the host computer 54.

Additionally, professional fee billing information via remote computer 46 is provided to bundled billing computer application 30. Remote computer 46 is in data communication with the bundled billing computer application 30 via a remote access means, such as, modems or the Internet or a direct cable. A communication layer 50 for remote access preferably handles the requirements for communications with remote computer 46 such as performing security checks and validations.

The bundled billing computer application 30 sends information related to the multiple patient activities 34, such as service data and bill drop data to the hospital host database computer applications 54 via communication layer 58.

The service data includes such information from computer 46 as what service entity (i.e., professional staff) provided what service in relation to a particular patient activity. Additionally, service data includes the charges associated with a particular patient activity.

In accordance with the teachings of the present invention and as described more fully below, the bundled billing computer application 30 provides bill drop data in order to indicate to the hospital host database computer applications 54 whether a particular patient activity should be billed. The hospital host applications 54 update the hospital host database 62 with this new information (i.e., bill drop data).

The bundled billing computer application 30 updates the bundled billing database 66 with information received from computers 38, 39 and 46 as well as with information from the hospital host applications 54.

Based upon the bill drop data as determined by the bundled billing computer application 30, accounts payable invoice(s) 70 and an insurance bill 74 related to the multiple patient activities 34 are generated. In the preferred embodiment, the A/P invoice(s) 70 are sent via an electronic link to the professional staffs account 75, and the insurance bill 74 is sent via an electronic link to the insurance company's records 77.

It should be noted that the present invention produces accounts payable invoice(s) 70 and a single insurance bill 74 at a single point in time despite many patient activities occurring over a period of time, such as a number of weeks or months. Additionally, the bundled billing computer application 30 generates suspect data and error files 78 whenever discrepancies are encountered between the bundled billing computer database 66 and the host database 62.

Application 30 generates bundled historical data 82 for review by such entities as the professional staff members through computer 46. The bundled historical data 82 contains information related to only professional services provided through computers 39 and 46. An overall historical data store 83 is maintained which provides an accurate assessment of all the charges and the services in addition to and including the bundled transactions. The overall historical data store 83 which is used for cost analysis includes such data as the types and the charges for professional services that are provided.

Since applications of the present invention include use by entities who are potentially competitors to each other, the present invention preferably provides data security measures to prevent a potential competitor reviewing another potential competitor's information related to a patient activity. For example, the present invention includes passwords and other identification means so as to allow a user to only view its own service data. In one embodiment, a bundle coordinator is provided with computer security screens which define the group of data an user is authorized to view or manipulate.

Moreover, the present invention preferably uses communication layer 58 to provide a degree of separation between the users of computers 38 and 46 from the hospital's host database computer applications 54 and the data that it processes in the hospital host database 62. Communication layer 58 includes utilizing batch jobs, such as IBM job control language (JCL) programs to accomplish the data interchange between the bundled billing computer application 30 and the hospital host database computer applications 54.

While the preferred embodiment of the present invention has been depicted with the bundled billing computer application 30 being securely separated from the hospital host applications 54, it should be understood that the present invention is not limited to that embodiment; rather, the present invention also includes embodiments wherein the bundled billing computer application 30 operates within the same process or on the same computer as the hospital host computer 54.

Figure 1B:
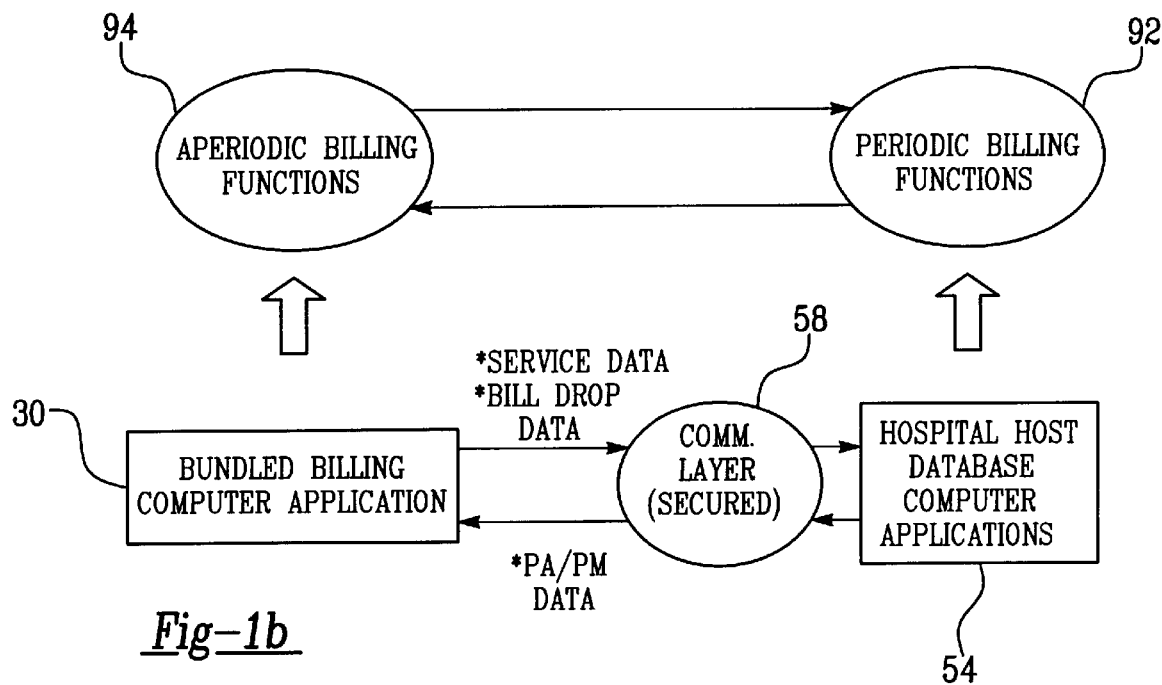

FIG. 1b shows a functional allocation of certain components of the computer architecture depicted in FIG. 1a.

According to FIG. 1b, the hospital host computer 54 performs periodic billing functions. These functions include sending bills out to the insurance companies on a periodic basis, such as on a weekly or daily basis.

The bundled billing computer application 30 performs aperiodic billing functions by ensuring that a bill is processed independent of any periodicity. The bundled billing computer application 30 once coupled onto the periodic billing functioning computer application 54 allows that application 54 to operate in an aperiodic manner. This acquired aperiodicity trait allows host computer application 54 to obviate the disadvantages of past systems by sending billing information aperiodically on demand by the bundled billing computer application 30 which bypasses the standard periodic bill drop process.

Figure 2A:
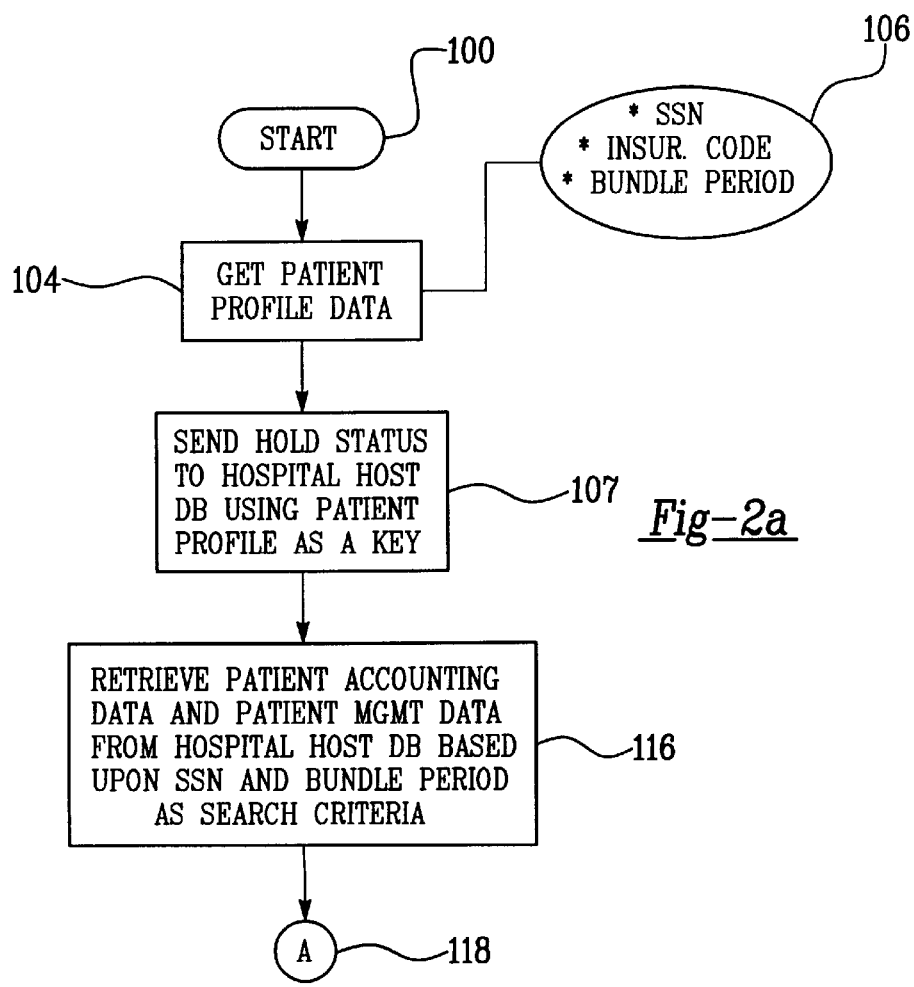

FIGS. 2a–2b are flowcharts depicting computer operations of the present invention which handle data related to multiple patient activities. When an agreement between a payor, for example an insurance company, and a hospital is reached for a patient entering treatment, a bundled billing coordinator establishes a patient profile within the bundle application at block 104. When the patient registers at the hospital (inpatient) or hospital clinic (outpatient) one of several bundled billing insurance plan codes is used in the registration and provides for an insurance code which is used to, in part, uniquely identify data within the present invention. The patient profile data 106 uses in the preferred embodiment the patient's social security number, the insurance code, and the bundle coverage period in order to uniquely identify a predetermined set of related activities of a patient over the course of the time period specified in the bundle. A set of related activities may be, for example, activities of a patient over a set period of time to treat a bone marrow transplant condition.

The patient profile data acts as a "hook" for the Bundle application to identify which patient accounting (PA) and patient management (PM) data to capture from the hospital host computer and send back to the Bundle application for processing. The first process that the Bundle application initiates is to create and send a batch host computer "bill hold" transaction which prevents the host computer from dropping (i.e., sending) a patient bill during normal host computer bill processing. This is performed at block 107. The bill hold remains in place until the Bundle application sends, preferably through batch, a bill release transaction.

Block 116 retrieves patient accounting data and patient management data from the host computer based upon the patient profile data. Continuation block A 118 indicates that processing continues on FIG. 2b.

With reference to FIG. 2b, decision block 124 determines whether any discrepancies exist in the entered insurance codes when patient accounting events are captured for the patient profile time frame and the social security. Any discrepancies are reported at block 128 in the form of suspect reports. Suspect reports are directed to any events with insurance plan codes that are not equal to the patient profile insurance plan codes. Block 132 loads the matching records into the bundled billing database for subsequent retrieval by the appropriate pro staff entities.

When the patient profile is established, the Bundle Pro Fee (i.e., professional services fees) data capture occurs at block 133. The Bundle computer application collects pro fee payable data in the form of invoices captured through on-line entry or by scanning subsystem interface data files. Block 134 stores the data in the bundled billing database and updates the host computer database. Processing terminates at end block 136.

Through this data capture arrangement, the data housed by the Bundle computer application is preferably unique in some respects to the data that is stored in the host computer. The data in the Bundle computer application is the invoice data which is translated to service codes which are sent to the host computer to post.

FIG. 3 is a flowchart showing the computer processing steps for generating an insurance bill or an accounts payable invoice. Block 154 determines which records satisfy the bill drop criteria based on the begin and end dates of the Bundle coverage period defined in the patient profile data.

All invoices captured are presented on-line at block 156 for the Bundle Coordinator to review and approve which is done for audit purposes. Notification and update processes are in place to resolve any invoices that are not approved for payment. When all invoices are approved for a given patient, the patient data enters into a 'collapse' status. A collapse status initiates block 158 which causes facility and professional fees from multiple patient accounts to be clustered (preferably into a single PA account number).

When the Bundle collapse is complete, the Bundle computer application sends a bill hold release (preferable via batch) transaction to the host computer at block 162. The normal host bill drop process generates at block 166 a single insurance claim for all facility and professional services provided to this patient during the Bundle coverage period. Processing terminates at end block 170.

Figure 4:
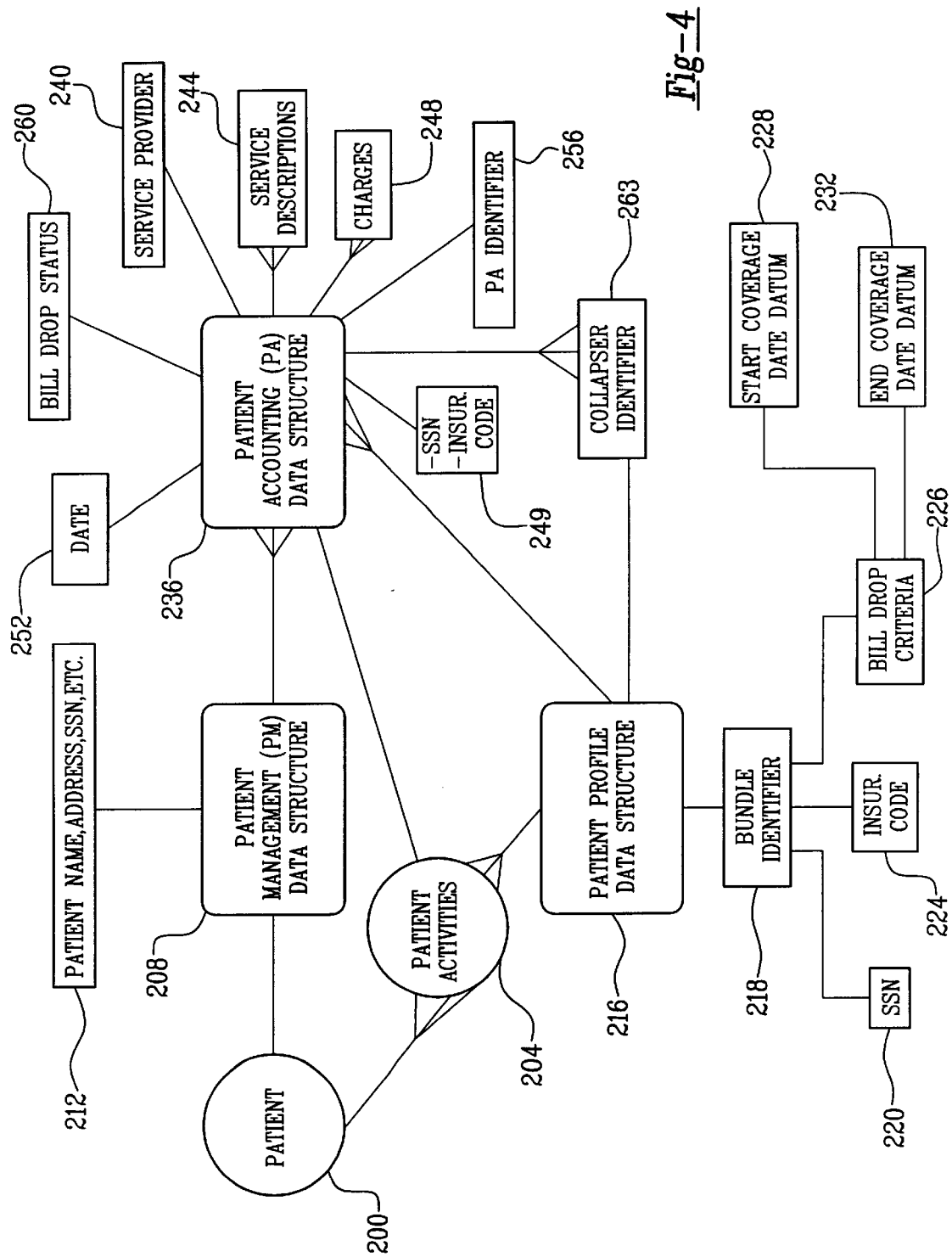
FIG. 4 is an entity relationship diagram depicting the interrelationships among the various data structures of the preferred embodiment of the present invention.

FIG. 4 is an entity relationship diagram depicting the data interrelationships among the various data structures of the present invention. The symbology used within FIG. 4 is that a tri-pronged ending of a line indicates a "many" relationship while a single-pronged ending indicates a "one" relationship. A patient 200 may have one or more patient activities 204, such as, X-rays or blood tests at a hospital or an examination by a doctor who is not located at a hospital. The present invention uses a patient management data structure 208 to hold personal information 212 about patient 200, such as the name of the patient, the address, date of birth and phone number.

The present invention utilizes a patient profile data structure 216 in order to uniquely identify a set of related patient activities 204 by a bundle identifier 218. In the preferred embodiment, the bundle identifier 218 uses the patient's Social Security Number 220, and insurance code 224 which identifies the payor for the patient activities 204, and a bill drop criteria 226. The bill drop criteria 226 preferably uses a start coverage date datum 228 and an end coverage date datum 232 in order to establish the criteria when a bill is ready for bundle processing and host system billing related to the patient activities 204.

The present invention utilizes a patient accounting data structure 236 in order to capture the details of each patient activity 204. The patient accounting data structure 236 includes the service provider 240, the service descriptions 244, and the charges data 248, as well as the date 252 of the activity. The preferred embodiment of the patient accounting data structure 236 provides for multiple service descriptions 244 and multiple charges 248 to be utilized in order to more fully capture the details of a patient activity 204.

The patient accounting data structure 236 contains a data group 249 in order to link the patient accounting data structure 236 with the patient profile data structure 216. Moreover, the patient accounting data structure 236 utilizes a PA identifier 256 in order to uniquely identify each patient accounting record. Related records in the patient accounting data structure are associated with a record from the patient profile data structure 216.

A bill drop status 260 is included in the patient accounting data structure 236 in order to indicate whether a bill or an accounts payable invoice should be sent relative to a patient activity 204. A collapse identifier 263 is used in the preferred embodiment to provide a single identifier of all bundled records for a particular patient profile entry which has satisfied its bill drop criteria 226. The collapse identifier 263 is exemplified in column 328 on FIG. 5.

An embodiment of the present invention provides for the patient management and patient accounting data structures (208 and 236) to exist on the host computer; the patient profile data structure 216 exists on the bundled billing computer database.

Although FIG. 4 depicts various types of cardinality for such data items as service descriptions 244, it should be understood that the present invention is not limited to only this type of cardinality but includes modifying the cardinality of the data items in order to meet the requirements of a specific application.

Figure 5:
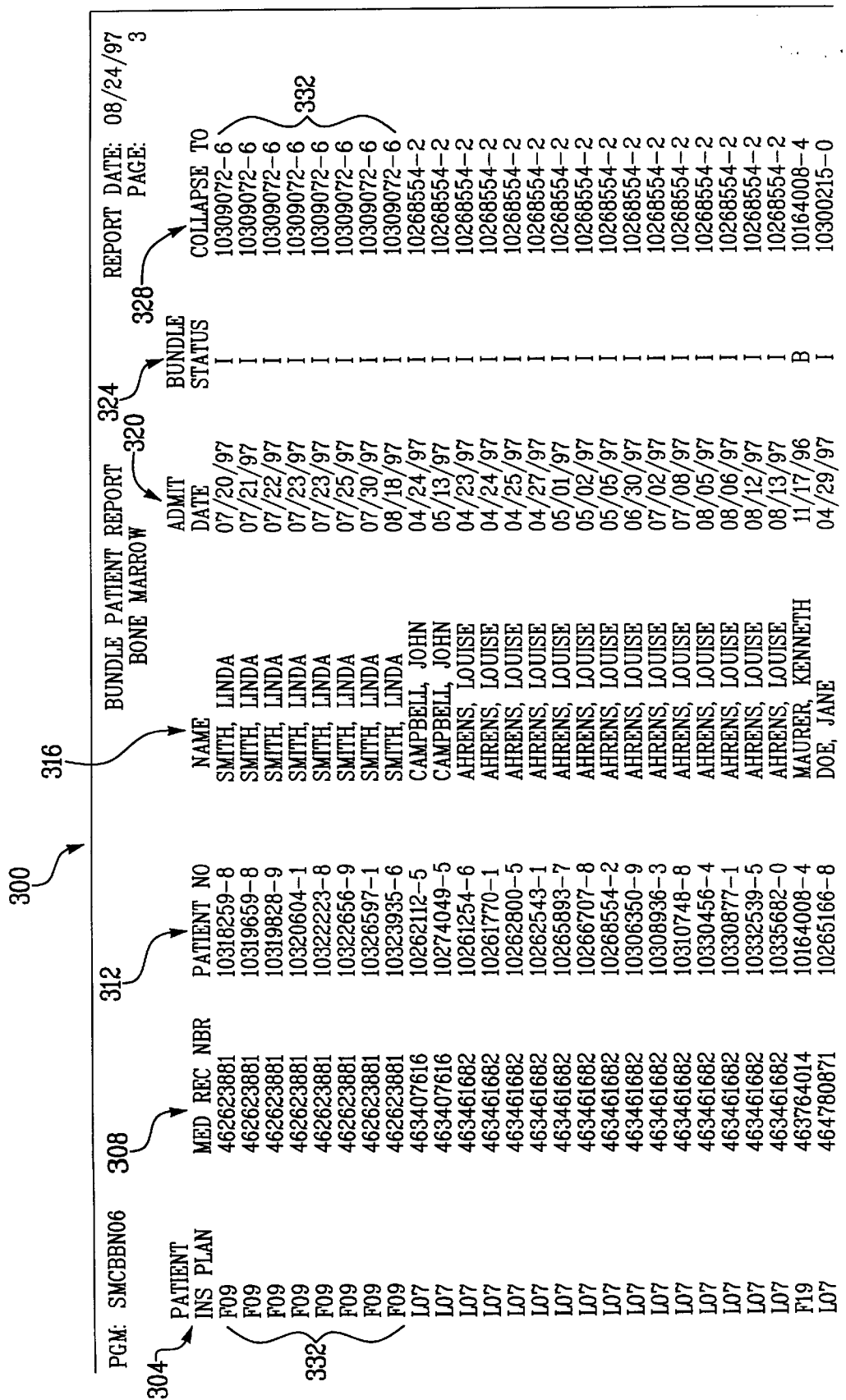
FIG. 5 is a computer generated report depicting an exemplary bundle patient report.

FIG. 5 shows an exemplary bundle patient report generally depicted at 300. The bundle patient report provides an accounting of patients currently being processed by the bundled billing application. Column 304 labeled "Patient Insurance Plan" contains the insurance code for each record of the report. Column 308 labeled "Medical Record Number" contains the Social Security Number of a patient. Column 312 labeled "Patient Number" contains the PA identifiers. Column 316 labeled "Name" contains the name of the patient. Column 320 labeled "Admit Date" contains the date on which the activity which generated this entry occurred. Column 324 labeled "Bundle Status" contains the status for each bundle record. The various values in this column represent the following: "I" represents inpatient; "B" represents that an insurance bill has been sent out and A/P request for payment to the Pro Staffs have been submitted; and "E" represents that a patient is eligible for review of invoices. Column 328 labeled "Collapse to" contains the collapse identifiers by which all related bundled records are identified.

More specifically, the collapse identifier in Column 328 is used in the preferred embodiment to cluster those bundled records which have the same insurance code contained in Column 304, and the same Social Security Number contained in Column 308, as well as, an admit date of Column 320 which falls within the bundle coverage period associated with the Social Security Number of the patient and the insurance code of the patient. While the preferred embodiment uses the first inpatient account number as the collapse identifier, it is to be understood, however, that the present invention is not limited to using only this type of an identifier. For example, the present invention may also use a unique sequentially generated number which is independent of the patient account numbers of Column 312.

The records identified by reference numeral 332 indicates a set of related multiple patient activities which are clustered when the bill drop criteria for these records is satisfied.

FIG. 6a is an exemplary bundle suspect report as generally depicted at 350. The bundle suspect report lists all patient accounts that are not properly coded for bundled billing processing, but are related to a bundle patient. The report provides a list of patient activities that may have been coded incorrectly at registration time. Patient accounts listed in this report are reviewed to determine whether the activity should be revised on the host computer in order to be included in the bundled billing application.

Column 354 labeled "Suspect Insurance Plan" contains the insurance plan codes which possibly are in error. Column 358 labeled "Medical Record Number" contains the Social Security Numbers for the patient of the record. Column 362 labeled "Patient Number" contains the patient account number (i.e., PA identifier) for the record.

Column 366 labeled "Name" contains the name of each patient in the report. Column 370 labeled "Admit Date" contains the date on which the transaction occurred. Column 374 labeled "Suspect Reason" contains the basis for why a particular record is considered suspect, such as "Invalid Bundle Code on SMS" wherein SMS represents the hospital host computer system.

FIG. 6b contains an exemplary bundle Profee charge extract error listing as generally depicted at 390. The term "Profee" represents a professional fee. This report lists all transactions found on a posting by a laboratory to a bundled billing account when there is a problem building a Profee transaction with the laboratory data provided. This report provides a listing of codes that may require a new bundle Profee service code to be set up in order to post the Profee.

Column 394 labeled "Patient Number" contains the patient account numbers (PA identifiers) for each record. Column 398 labeled "TDate" represents the transaction date of the service provided. Column 402 labeled "Patient Name" contains the name of the patient for a record. Column 406 labeled "Error Message" contains the basis for an error. Such an error includes, the situation when a service provider, such as a lab or radiology office, uses a service code which has not been defined by the bundled billing computer application having a related pro fee service.

FIG. 6c shows an exemplary bundle MRM Profee charge extract error listing as generally depicted at 410. For sake of clarity, the term "MRM" represents data from a radiology department. This report lists all transactions found on the MRM interface posting to bundled billing accounts when there is a problem building a Profee transaction with the interface data provided. More specifically, this report provides a listing of codes that may require a new bundle Profee service code to be set up in order to post the Profee. This report uses column headings similar to the headings of report 390 on FIG. 6b.

FIG. 7 shows an exemplary bundled billing accounts payable (AP) invoice as generally depicted at 420. Upon satisfaction of the bill drop criteria for a given patient profile entry, a summarized invoice total is generated and represents the amount which the hospital is to pay to the Pro staff (i.e., professional staff member, such as a doctor) for Profee charges which were entered into the system by the Pro staff entity via the computer interfaces depicted on FIG. 1a. The preferred embodiment also includes an electronic interface with the accounts payable system which automatically credits the account of the Pro staff entity, thereby further removing the disadvantage of previous systems of an inordinate amount of paperwork and paper associated with hospital accounting. The amount indicated by reference numeral 424 is the total amount due to the professional service providers for a particular patient profile entry; the detail supporting detail for the overall charge is documented as shown in FIG. 8.

FIG. 8 is an exemplary bundle billing detailed invoice report as generally depicted at 440. Report 440 provides the itemized professional service charges for each service performed related to a particular patient profile entry. The itemized approved amounts contained on report 440 aggregate to the total amount 424 of FIG. 7. Accordingly, through utilization of the present invention, the advantage of sending a single accounts payable invoice is realized thereby obviating the disadvantages of previous systems.

Likewise, a single insurance bill can be generated as shown in FIG. 9 for a particular patient profile entry that has satisfied its bill drop criteria and has caused the collapse/bundle of multiple billing accounts/events. The collapsing/bundling of insurance bills reduces the number of insurance bills that are periodically produced to a single bill that is aperiodically produced.

FIG. 10a–10c are structure charts illustrating the batch flow processes used in exchanging information between the bundled billing application and the host computer application of the hospital. Referring to FIG. 10a, the bundled billing computer application preferably starts batch process 480 at night so as to not interfere with the peak computer usage of the hospital host database during the day. Batch process 480 executes a program to close the bundle status on-line file, create bundle file backups, and create bundle (on-line) post-file backup. Batch process 484 executes a program to update the status level of bundle patients in the bundle status file and writes a record to the message center screen (which is described in detail below); if there has been a change to the status of a bundle record. Batch process 488 performs a step that creates charge and credit records for posting to the hospital host computer system's patient accounting database. Next, batch process 488 batches the charge and credit records for posting to the hospital host computer system's (inpatient) patient accounting database. Next, the batch process batches the charge and credit records for posting to the hospital host computer system's (outpatient) patient accounting database. The last step includes the deletion and definition for the VSAM files for next day's processing.

The preferred embodiment of the present invention utilizes VSAM files as implemented on an IBM mainframe computer system, such as on an S390 computer system. The VSAM files refer to such files as patient profile files and invoice files of the present invention.

Batch process 492 executes a program to create a temporary backup of the status file in case of a re-start and creates transfer (collapse) charge transactions, bill hold release transactions, and comment record transactions. Also batch 492 processes the charge and credit records for posting to the hospital host computer system's (inpatient) patient accounting database. Next, the batch process batches the IP (inpatient) release and comment records for posting to the hospital host computer system's (inpatient) patient accounting database. The batch process batches charge and credit records for posting to the hospital host computer system's (outpatient) patient accounting database. Batch process 492 batches the outpatient (OP) release and comment records for posting to the hospital host computer system's (outpatient) patient accounting database. Next, the batch process executes a program to: check the charge transfer status to see if the bill-to-patient number has been finally billed; create bundled billing invoices for charges captured via the interfaced applications; create transactions to perform the collapse; and create accounts payable invoices for charges captured via the computer interfaces as described in FIG. 1a.

Batch process 496 executes a program to: read a message file in order to send those records that are over twenty-one days to a history file; create a new generation of message history files; copy bundled old charges to a history file which can be used by hospital financial analysts in order to ascertain a more accurate assessment for the costs and services for each type of care required; and delete and define the VSAM files.

Batch process 500 in the preferred embodiment is not part of the bundle computer application but rather is a production job that triggers such bundle jobs as batch process 504. The term "production jobs" refers to batch programs which execute in the normal/daily processes.

Batch process 504 executes a program to: sort the current day's interface data with the prior day's interface error records (e.g., the Profee charge extract listing report); sort records by Social Security Number, patient accounting number and doctor number. Next, the batch process batches inpatient charges captured from an interfaced application and batches outpatient charges captured from an interfaced application. Batch process 508 is not part of the bundled computer application in the preferred embodiment, but rather is a production job that triggers certain bundle jobs.

When batch process 512 is triggered, batch process 512 executes a program to sort the current day's received data with the prior day's interfaced error records (e.g., Profee charge extract listing report). The batch process sorts the records by Social Security Number, patient accounting number and doctor number. Next, the batch process batches inpatient charges captured from an interfaced application and batches outpatient charges captured from an interfaced application.

Referring to FIG. 10b, batch process 520 in the preferred embodiment is not part of the bundle billing computer application, but rather is a production job that triggers certain bundle jobs, such as batch process 524. Batch process 524 executes a program to close the bundle status on the on-line file and backs up the bundle on-line files before the morning batch processing updates occur.

Batch process 528 executes a program to generate message center message files in order to communicate various status changes to the users. The batch process also opens bundle on-line files which are used to populate Bundled billing on-line screens Batch process 532 executes a program to create a bundled detailed charges file and updates the bundle patient status files. The batch process also identifies suspect records by bundle type and insurance plan code. Batch process 536 executes a program to create the bundle suspect report.

Referring to FIG. 10c, batch process 544 is not part of the bundle billing computer application, but rather is a production job that triggers another production job 548. Production job 548 triggers the bundle billing batch process 552. Batch process 552 performs the following top level functions: close bundle files; and create bundle service code files.

Figure 11:
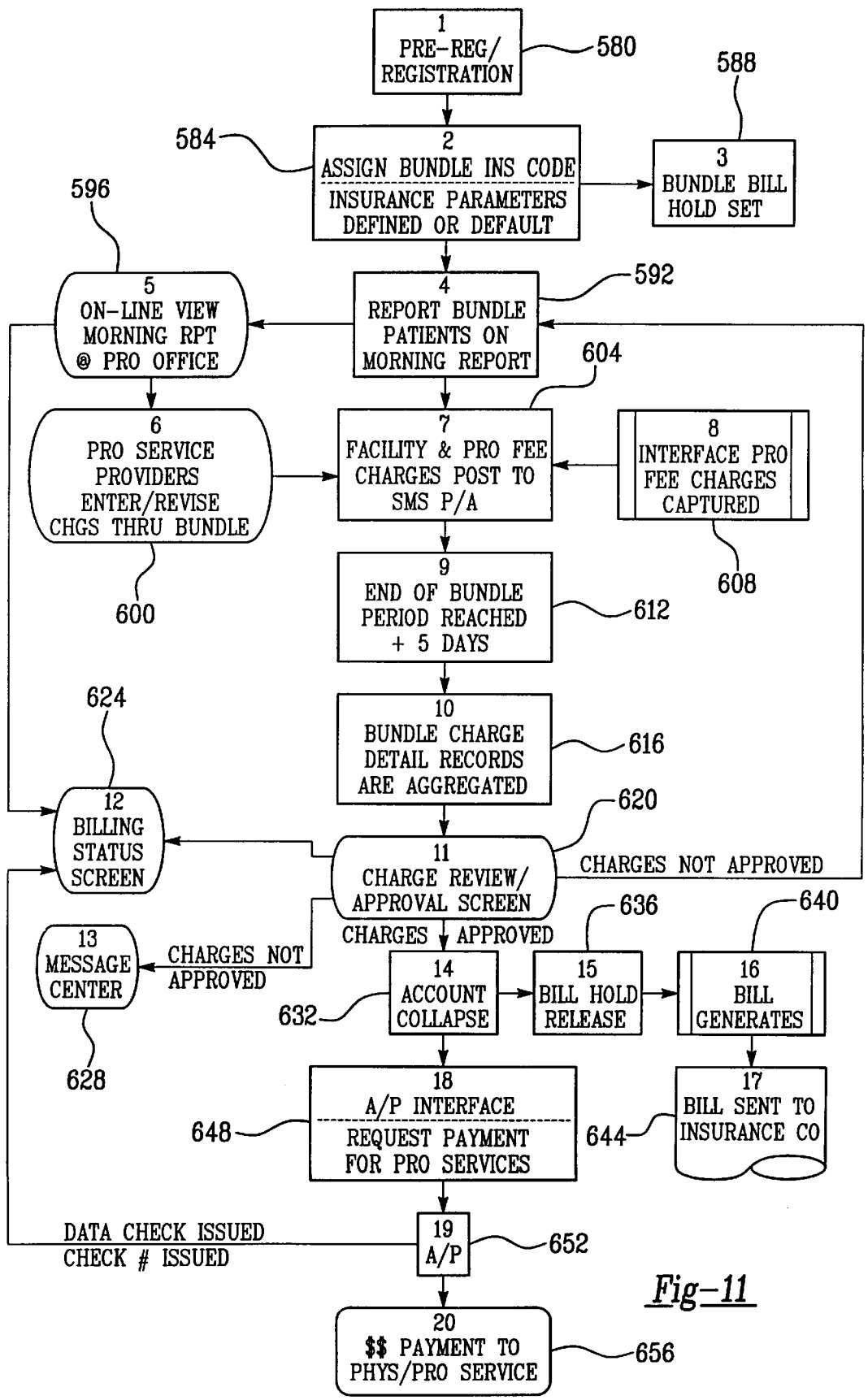
FIG. 11 is a flowchart depicting the bundled billing process flow with associated computer screens.

FIG. 11 is a bundled billing process flowchart which references various user interfaces. As indicated by block 580, pre-registration and registration occurs first wherein a coordinator recognizes that this patient meets the criteria for entry into the bundled billing computer application. A bundle insurance code which has predefined insurance parameters is assigned at block 584. Once the Social Security Number and the bundle period coverage data is entered into the computer system, then block 588 sets a bundle bill hold wherein the hospital host computer system is informed that bills related to this bundle are not to be sent until the bundle bill drop criteria has been satisfied.

Block 592 illustrates that subsequent to a patient being registered into the bundle billing computer system, the bundled billing data for that patient can be viewed on a report which is preferably generated each morning. Moreover, this data can be viewed on-line at the professional staffs office as indicated at block 596. Block 600 illustrates that the professional service providers can perform several functions, such as entering and revising the professional services data that is in the bundle billing computer application.

Block 608 indicates that a computer-human interface captures Profee charges for each activity that occurs relative to a patient in the bundle billing computer application. The facility and professional fee charges are posted to the hospital's host computer system via the bundled billing computer application as indicated at block 604.

Preferably, five days before the end of a bundle period for a particular patient profile entry, as indicated at block 612, bundle charge detail records are aggregated at block 612 in order to be reviewed via the coordinator screens as indicated at block 620.

If the charges are not approved, then processing returns to block 592 wherein the originator of the bundled charges is advised of a problem in the review process regarding their charges and provides updates to their charges on file. Additionally, if the charges are not approved, then a message is sent to the message center so that the proper person can be notified of the unapproved charges as indicated at block 628. Moreover, the billing status can be viewed via a computer-human interface by the person who has the responsibility of approving the charges as well as by personnel at the professional service office as indicated by block 624.

If the charges are approved via block 620, then the bundled accounts are clustered at block 632 via the collapse process. After the bundled billing computer application sends to the hospital host computer application a bundled bill release data signal as indicated at block 636, then block 640 generates the insurance bill. Block 644 sends the generated insurance bill to the insurance company or whoever has been designated as the payor of the bill. This delivery in the preferred embodiment is via an electronic link to further reduce the amount of paper generated. However, it should be understood that the present invention includes also using non-electronic delivery mechanisms in order to deliver the insurance bill to the proper payor.

Correspondingly, after the account has been collapsed (i.e., clustered) at block 632, an accounts payable interface at block 648 is used in order to create the proper request for payment of the professional services. Block 652 generates an accounts payable form so that block 656 can send via electronic or non-electronic delivery mechanisms the money payment to the professional service entity. Moreover, block 652 provides the date on which the check was issued as well as the check number so that the billing status screen of block 624 can view the information.

Figure 12A:
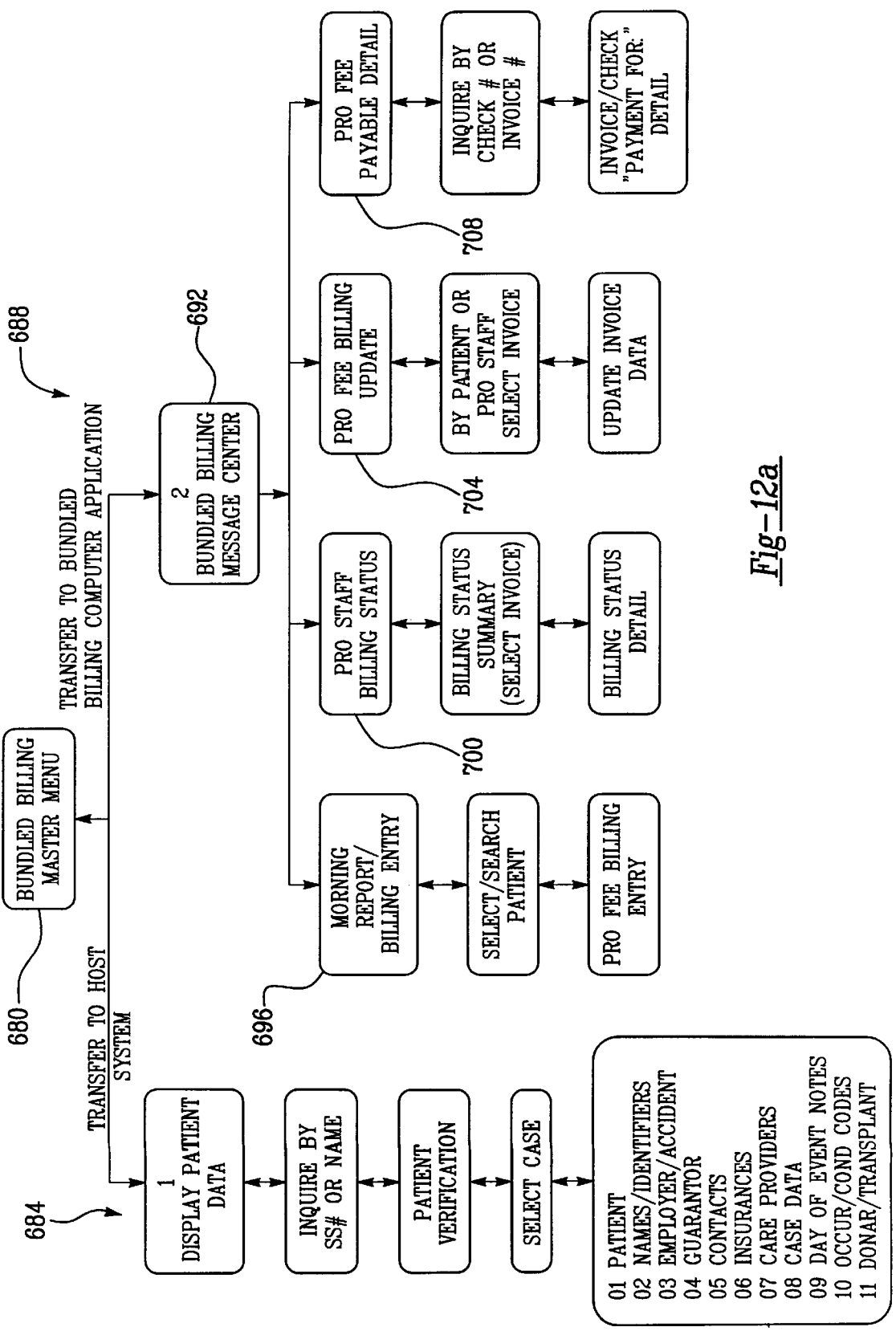
FIGS. 12a–12b are computer screen hierarchies depicting the various computer screens used by the present invention.

FIG. 12a shows a computer screen hierarchy for the preferred embodiment of the present invention. These computer-human interfaces (i.e., computer screens) provide users with access to data for data entry, data modification, data viewing, and data deletion purposes.

The bundled billing master screen 680 provides inquiry access to the data within the hospital's host computer database as generally shown at 684 and inquiry and update access to the bundled billing database as generally shown at 688. The screens within the general depiction of reference number 684 allow users (which include remote users, such as doctor offices) to view only patient data in a secured manner.

The screens that are related to the bundled billing computer application are generally depicted at 688. A top level bundled billing message center 692 access to the following screens: the morning report/billing entry 696; the Prostaff billing status screen 700; the Profee billing update screen 704; and the Profee payable detail screen 708. Each of these screens is described in greater detail below.

Figure 12B:
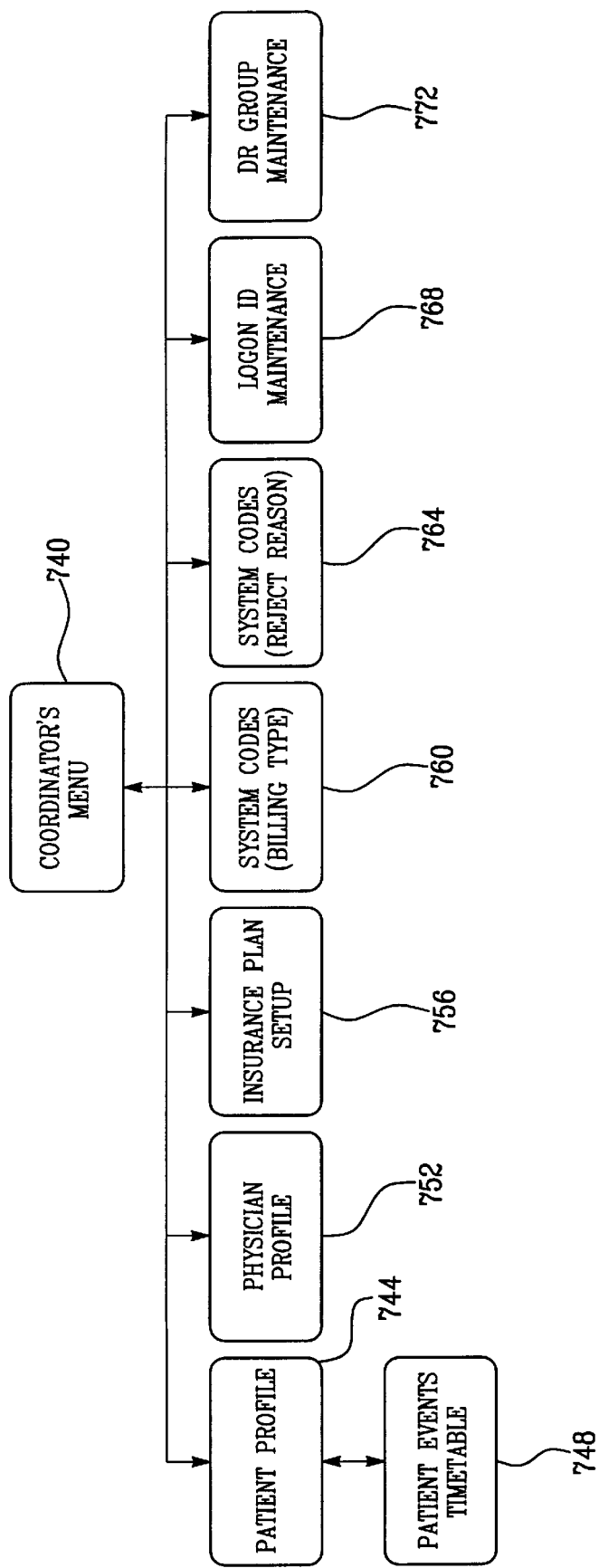

FIG. 12b depicts the screen hierarchy for use in data administration and coordination. The top level coordinator's screen 740 allows access to a number of subscreens. The patient profile screen 744 allows a coordinator to perform data operations upon data related to the patient profile, such as Social Security Number, insurance code, begin/end coverage dates (i.e., bundle coverage periods). Moreover, screen 744 provides access to the patient's events timetable 748 for the following purpose: to communicate specific dates and courses of scheduled treatments.

A coordinator is able to perform data operations upon physician profile data via physician profile screen 752. The physician profile screen 752 includes such data related to a physician, as percentage payout, authorized users to view a doctor's data.

A coordinator is able to perform data operations upon an insurance plan using the insurance plan set-up screen 756. The insurance plan set-up screen 756 includes such information as insurance code, group of service codes associated with a provider. Service codes are identifiers linked to service descriptions.

A coordinator is able to perform data operations upon the system codes (e.g. the billing type) via screen 760. The system codes screen 760 includes such information as bundled billing type. The bundled billing type refers to a certain set of users of the bundling data (e.g., bone marrow transplant, international cardiac care, hospice, etc.).

A coordinator is able to perform data operations via screen 764 upon system codes that relate to reasons for rejections which occur during invoice review. Moreover, a coordinator is able to perform administrative functions using the log-on ID maintenance screen 768 and the DR (doctor) group maintenance screen 772. Screen 772 allows a coordinator to define/remove doctors or service providers authorized to bill through the bundled billing application.

FIG. 13a depicts an exemplary message center screen 692. The message center screen 692 allows personnel to effectively communicate with the professional staff and to enable the professional staff to search for data related to bundled billing patients. Such messages include "not approved" transactions which require resolution by a service provider, or pending deadlines for charge entries, as well as important free-form messages about a bundled patient that a professional staff wishes to communicate to the hospital personnel. Message 800, for example, indicates that the charge entry for this particular bundled patient will be closed at end of business on a given date.

FIG. 13b depicts an exemplary morning report screen 696. The morning report screen 696 allows a person to select and search for a patient in order to enter billing information related to a professional services. This group of patients represents a subset of the host patient group. If a patient is not listed on this screen, charges cannot be entered. This ensures that if charges are entered, the computer application is prepared to process the charges.

FIG. 13c is an exemplary Prostaff billing status screen 700. The Prostaff billing status screen 700 allows hospital personnel to provide the professional staff with a status of their professional fee billing. Such information includes bill date and check status.

FIG. 13d depicts an exemplary Profee billing update screen 704. The Profee billing update screen 704 allows a Prostaff entity to update the invoice data after selecting a specific invoice.

FIG. 13e shows an exemplary Profee payable detail screen 708. This screen allows a user to check the details of charge information through inquiries of the data by check number or invoice number.

FIG. 14 is an exemplary bundle billing patient profile screen 744. The bundle billing patient profile screen 744 controls several aspects of the bundle billing process. The screen directs the bundle billing computer application to present a patient to the Prostaff through the bundle billing morning report from which they select their patient to submit Profee billing. The Prostaff cannot enter Profee charges on a patient unless the patient is presented on the morning report. This ensures the hospital that the patient is a recognized bundle billing patient. Moreover, screen 744 directs the bundle application to send out a bundle billing message center communication, seven days prior to the coverage end date of the bundle period, advising the Prostaff personnel that "CHARGE ENTRY WILL BE CLOSED AT END OF BUSINESS <coverage end date +5 days>".

Screen 744 also directs the bundle application to consolidate this patient's bundle coded patient accounting event within the coverage begin date and end date. Additionally, screen 744 directs the bundle application to capture donor patient accounting events for bundling with the recipient's billing. In the preferred embodiment, three conditions must be satisfied before the donors' patient accounting event is bundled with the recipients' billing: (i) the donor has a bundle billing patient profile set up, identifying the recipient's Social Security Number in the donor's recipient Social Security Number field; (ii) the donor's event has been registered with the same bundle insurance plan that is established on the patient profile; and (iii) the donor's event, if one exists, has occurred within the begin date and end date of the recipient's coverage.

The embodiments which have been set forth above were for the purpose of illustration and were not intended to limit the invention. It will be appreciated by those skilled in the art that various changes and modifications may be made to the embodiments discussed in this specification without departing from the spirit and scope of the invention as defined by the appended claims.

It is claimed:

1. A computer-implemented method for aperiodically processing patient accounting data in a periodic hospital accounting database, comprising the steps of:
   (a) receiving patient profile data which establishes activity criteria for grouping activities by a patient;
   (b) associating said patient profile data with a predetermined bill drop criteria;
   (c) receiving a plurality of accounting data that is indicative of activities by a patient;
   (d) performing steps (e)-(f) for the accounting data that satisfies said activity criteria of said patient profile data:
   (e) associating said satisfied accounting data with said patient profile data;
   (f) generating bill stay flags associated with said satisfied accounting data on said periodic hospital accounting database;
   (g) determining whether said bill drop criteria of said patient profile data is satisfied;
   (h) performing steps (i)-(j) when said bill drop criteria of said patient profile data is satisfied:
   (i) retrieving the patient accounting data that is associated with said patient profile data;
   (j) generating financial data based upon said retrieved patient accounting data.

2. The method according to claim 1 wherein said patient profile data includes a payor identifier code and a patient identifier.

3. The method according to claim 1 wherein said bill drop criteria includes coverage date periods.

4. The method according to claim 1 wherein said accounting data includes financial data, service description data, and service provider data.

5. The method according to claim 1 wherein said financial data includes data being selected from the group consisting of billing data, accounts payable data, and combinations thereof.

6. The method according to claim 1 wherein said patient profile data includes a payor identifier code, said method further comprising the step of:

electronically delivering said generated financial data to a payor identified by said payor identifier code.

7. The method according to claim 1 further comprising the step of:

generating bill drop flags on said periodic hospital accounting database for the accounting data associated with said satisfied bill drop criteria of said patient profile data.

8. The method according to claim 1 further comprising the step of:

remotely receiving a plurality of accounting data via a remote computer data connection.

9. The method according to claim 1 further comprising the steps of:

clustering said accounting data associated with said satisfied bill drop criteria of said patient profile data, said clustering being performed based upon said patient profile data; and assigning a cluster identifier to said clustered accounting data.

10. A computer-implemented apparatus for aperiodically processing patient accounting data in a periodic hospital accounting database, comprising:

(a) means for receiving patient profile data which establishes activity criteria for grouping activities by a patient;

(b) means for associating said patient profile data with a predetermined bill drop criteria;

(c) means for receiving a plurality of accounting data that is indicative of activities by a patient;

(d) means for performing steps (e)-(f) for the accounting data that satisfies said activity criteria of said patient profile data:

(e) associating said satisfied accounting data with said patient profile data;

(f) generating bill stay flags associated with said satisfied accounting data on said periodic hospital accounting database;

(g) means for determining whether said bill drop criteria of said patient profile data is satisfied;

(h) means for performing steps (i)-(j) when said bill drop criteria of said patient profile data is satisfied:

(i) retrieving the patient accounting data that is associated with said patient profile data;

(j) generating financial data based upon said retrieved patient accounting data.

11. The apparatus according to claim 10 wherein said patient profile data includes a payor identifier code and a patient identifier.

12. The apparatus according to claim 10 wherein said bill drop criteria includes coverage date periods.

13. The apparatus according to claim 10 wherein said accounting data includes financial data, service description data, and service provider data.

14. The apparatus according to claim 10 wherein said financial data includes data being selected from the group consisting of billing data, accounts payable data, and combinations thereof.

15. The apparatus according to claim 10 wherein said patient profile data includes a payor identifier code, said apparatus further comprising:

means for electronically delivering said generated financial data to a payor identified by said payor identifier code.

16. The apparatus according to claim 10 further comprising;

means for generating bill drop flags on said periodic hospital accounting database for the accounting data associated with said satisfied bill drop criteria of said patient profile data.

17. The apparatus according to claim 10 further:

means for remotely receiving a plurality of accounting date via a remote computer data connection.

18. The apparatus according to claim 10 further comprising means means for clustering said accounting data associated with said satisfied bill drop criteria of said patient profile data, said means for clustering being performed based upon said patient profile data; and means for assigning a cluster identifier to said clustered accounting data.

* * * * *

UNITED STATES PATENT AND TRADEMARK OFFICE
CERTIFICATE OF CORRECTION

PATENT NO. : 5,956,690
DATED : September 21, 1999
INVENTOR(S) : Haggerson et al.

It is certified that error appears in the above-identified patent and that said Letters Patent is hereby corrected as shown below:

On the Title Page, in the Title, line 2, "SYSTEMS" should be --SYSTEM--.

Column 1, line 2, "SYSTEMS" should be --SYSTEM--.

Column 3, line 14, "staffs" should be --staff's--.

Column 3, line 46, "an" should be --a--.

Column 9, line 63, "staffs" should be --staff's--.

Column 14, line 37, claim 17, after "further" insert --comprising--.

Column 14, line 39, claim 17 "date" should be --data--.

Column 14, line 41, claim 18, "means" should be --:--.

Signed and Sealed this

Thirty-first Day of October, 2000

Attest:

Q. TODD DICKINSON

*Attesting Officer*     *Director of Patents and Trademarks*